(No Model.)

J. W. DODGE & T. A. BRESNAHAN.
Device for Trimming the Sole Edges of Boots and Shoes.

No. 238,033.   Patented Feb. 22, 1881.

UNITED STATES PATENT OFFICE.

JOHN W. DODGE, OF MALDEN, AND TIMOTHY A. BRESNAHAN, OF BOSTON, MASSACHUSETTS.

DEVICE FOR TRIMMING THE SOLE-EDGES OF BOOTS AND SHOES.

SPECIFICATION forming part of Letters Patent No. 238,033, dated February 22, 1881.

Application filed December 9, 1880. (No model.)

*To all whom it may concern:*

Be it known that we, JOHN WESLEY DODGE, of Malden, in the county of Middlesex and State of Massachusetts, and TIMOTHY A. BRESNAHAN, of Boston, in the county of Suffolk and State aforesaid, have invented a new and useful Improvement in Devices for Trimming the Edges of the Soles of Boots and Shoes, of which the following is a full, clear, concise, and exact description, reference being had to the accompanying drawings, of which—

Figure 1:
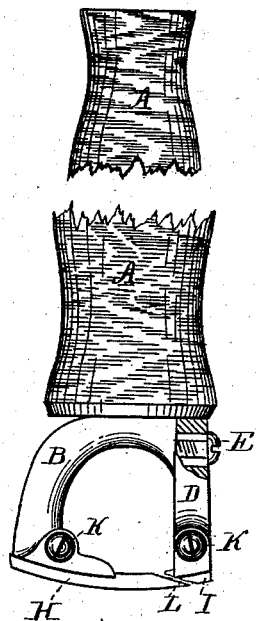
Figure 2:
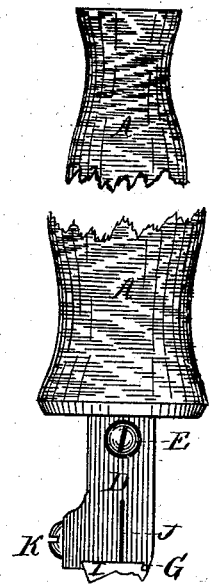
Figure 3:
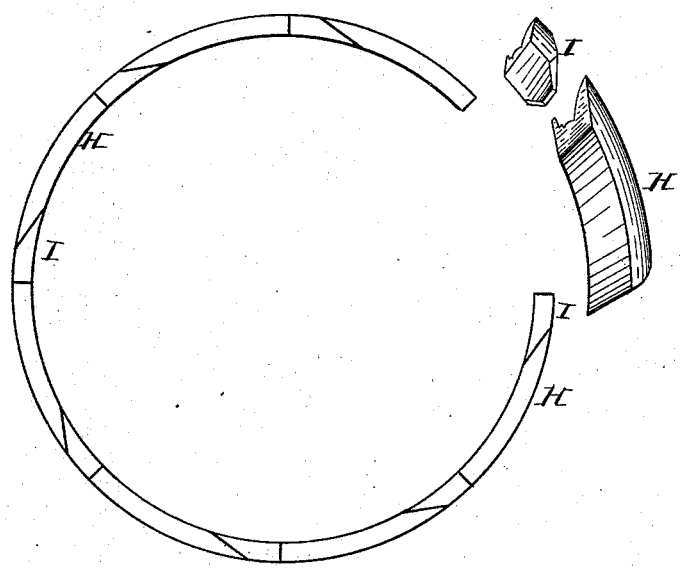

Figure 1 is a side elevation. Fig. 2 is a front elevation. Fig. 3 is a diagram illustrating the manufacture of the guards and knives and showing the forged steel ring with a guard and knife cut from it.

One object of our invention is to simplify and cheapen the construction and at the same time produce a shoe-edge plane which shall be efficient in its operation and easily sharpened or repaired.

A is the handle; B, the tool-stock; D, the guard-stock, held to the stock B by a screw, E, as shown in Fig. 1, and arranged with a groove on its inner face to receive a tongue on the stock B, so that, the screw E being loosened, the stock D may be moved up or down, thus gaging the depth of cut. Across the lower face of stocks B and D a groove is cut of the shape shown at G, and of sufficient size to allow the plane-knife H and the gage I to be slid into the positions shown in Fig. 1. From the bottom of the groove G a slit is cut lengthwise of the stocks, as shown at J, and extending far enough back in the stocks to allow of the jaws thus made being sprung together by the screws shown at K, so that the sides of the groove may be made to clamp the plane-knife and gage when they have been slid into position in the groove, and thus hold them firmly and securely in said position ready for use.

The knife H and the gage I may be best understood by explaining the mode of construction. They are made of one piece of steel (which is uniform throughout) by making a transverse oblique cut through it, as shown at L, Fig. 1, the edge of the piece H nearest the gage I being the cutting-edge. The single piece from which the knife or cutter H and the gage I are in this way made is a section of a ring, as will appear by reference to Fig. 3, so that in the manufacture a ring of steel is forged and finished and cut into sections sufficient for a single-edge plane, as shown in Fig. 3, which sections are afterward separated by the cut shown at L, Fig. 1, into the knife H and gage I. This simplifies and cheapens the construction of the cutter and gage, while at the same time an efficient cutter and gage are obtained, both of which are easily removed or adjusted, and both of which can be removed and replaced by others of a different pattern calculated to produce a different style of edge for the sole.

In our improved plane, cutters and gages of any pattern may be used in the same stock and with equal efficiency.

We are aware that the blades of edge-planes are frequently clamped to the stocks, as above described; but the clamping of the gage to its stock and forming the gage and stock from sections of a ring and clamping both to their stocks are new with us.

What we claim as our invention is—

In an edge-plane, the removable gage I, made uniform with the vertically-adjustable knife H, and combined with the adjustable gage-stock, all arranged substantially as described and set forth.

J. WESLEY DODGE.
T. A. BRESNAHAN.

Witnesses:
WM. A. MACLEOD,
J. R. SNOW.